(12) United States Patent
Kirihara et al.

(10) Patent No.: US 11,833,608 B2
(45) Date of Patent: Dec. 5, 2023

(54) LASER PROCESSING METHOD

(71) Applicant: DISCO CORPORATION, Tokyo (JP)

(72) Inventors: Naotoshi Kirihara, Tokyo (JP); Takamasa Kaneko, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 141 days.

(21) Appl. No.: 17/653,564

(22) Filed: Mar. 4, 2022

(65) Prior Publication Data

US 2022/0288719 A1 Sep. 15, 2022

(30) Foreign Application Priority Data

Mar. 9, 2021 (JP) ................... 2021-037797

(51) Int. Cl.
*B23K 26/0622* (2014.01)
*B23K 26/40* (2014.01)
*B23K 26/352* (2014.01)
*B23K 26/364* (2014.01)
*B23K 101/40* (2006.01)

(52) U.S. Cl.
CPC ........ *B23K 26/0622* (2015.10); *B23K 26/352* (2015.10); *B23K 26/364* (2015.10); *B23K 26/40* (2013.01); *B23K 2101/40* (2018.08)

(58) Field of Classification Search
CPC ............. B23K 26/0622; B23K 26/352; B23K 26/364; B23K 26/40; B23K 2101/40; H01L 21/02002; H01L 23/544
See application file for complete search history.

(56) References Cited

U.S. PATENT DOCUMENTS

| | | | |
|---|---|---|---|
| 2008/0217560 A1* | 9/2008 | Rodgers | B23K 26/0624 250/492.2 |
| 2010/0009550 A1* | 1/2010 | Tsujikawa | B23K 26/0604 438/798 |
| 2012/0322239 A1* | 12/2012 | Singh | H01L 21/6836 156/345.35 |

FOREIGN PATENT DOCUMENTS

| | | | | |
|---|---|---|---|---|
| EP | 1235269 A2 | * | 8/2002 | ............ H01L 22/22 |
| JP | 2015050434 A | * | 3/2015 | |
| JP | 2015126054 A | | 7/2015 | |
| KR | 20140041749 A2 | * | 4/2014 | |

* cited by examiner

*Primary Examiner* — Nathaniel E Wiehe
*Assistant Examiner* — Spencer H. Kirkwood
(74) *Attorney, Agent, or Firm* — Greer Burns & Crain Ltd.

(57) ABSTRACT

There is provided a laser processing method for performing laser processing on a wafer having a functional layer on a substrate. The laser processing method includes a blackening step of emitting a pulsed laser beam of a wavelength transparent to the functional layer from a laser oscillator and blackening the functional layer by irradiating the functional layer with the pulsed laser beam of energy equal to or higher than a processing threshold value at which the functional layer is processed such that an overlap ratio of the pulsed laser beam successively applied to the functional layer is equal to or more than 90% and less than 100%, and a groove processing step of forming a laser-processed groove by irradiating the blackened functional layer with the pulsed laser beam and making the blackened functional layer absorb the pulsed laser beam, after performing the blackening step.

2 Claims, 8 Drawing Sheets

LASER PROCESSING METHOD

BACKGROUND OF THE INVENTION

Field of the Invention

The present invention relates to a laser processing method that performs laser processing on a wafer having organic films on a substrate.

Description of the Related Art

In recent years, in order to increase semiconductor device processing speed, there has been put to practical use a semiconductor wafer in which semiconductor devices are formed by laminating interlayer insulating films formed of an organic low dielectric constant material (what is generally called a Low-k material), the interlayer insulating film being a polyimide-based polymer film, a parylene-based polymer film, or the like, onto a silicon wafer together with a circuit layer, and thus organic films are laminated on the surface of a substrate formed of silicon (see Japanese Patent Laid-Open No. 2015-126054, for example).

SUMMARY OF THE INVENTION

The Low-k material is brittle like mica, and is peeled when cut by a cutting blade. Accordingly, as disclosed in Japanese Patent Laid-Open No. 2015-126054, a laser ablation technology is used to form laser-processed grooves in a device layer including the Low-k material.

A laser beam having a wavelength of 355 nm or 532 nm, for example, is used for ablation processing of the semiconductor wafer. However, the interlayer insulating film as the Low-k material is transparent to the laser beam in these ultraviolet to visible light regions, and does not absorb the applied laser beam. Thus, the device layer is processed together with the silicon wafer by condensing the laser beam in the silicon wafer.

However, there is a problem in that, for example, the organic films are locally peeled as the laser beam is condensed in the silicon wafer and the silicon wafer sublimates. An improvement has therefore been desired.

It is accordingly an object of the present invention to provide a laser processing method that can suppress the peeling of the organic films.

In accordance with an aspect of the present invention, there is provided a laser processing method for performing laser processing on a wafer having organic films on a substrate, the laser processing method including a blackening step of emitting a pulsed laser beam of a wavelength transparent to the organic films from a laser oscillator and blackening the organic films by irradiating the organic films with the pulsed laser beam of energy equal to or higher than a processing threshold value at which the organic films are processed such that an overlap ratio of the pulsed laser beam successively applied to the organic films is equal to or more than 90% and less than 100%, and a groove processing step of forming a laser-processed groove by irradiating the blackened organic films with the pulsed laser beam and making the blackened organic films absorb the pulsed laser beam, after performing the blackening step.

Preferably, in the blackening step, base parts of a Gaussian distribution of the pulsed laser beam applied to the organic films are modified to a vertical distribution, so that the pulsed laser beam of energy lower than the processing threshold value is prevented from being transmitted through the organic films and applied to the substrate.

The present invention produces an effect of being able to suppress the peeling of the organic films.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

An embodiment of the present invention will hereinafter be described in detail with reference to the drawings. The present invention is not limited by contents described in the following embodiment. In addition, constituent elements described in the following include constituent elements readily conceivable by those skilled in the art and essentially identical constituent elements. Further, configurations described in the following can be combined with each other as appropriate. In addition, various omissions, replacements, or modifications of configurations can be performed without departing from the spirit of the present invention.

Figure 1:
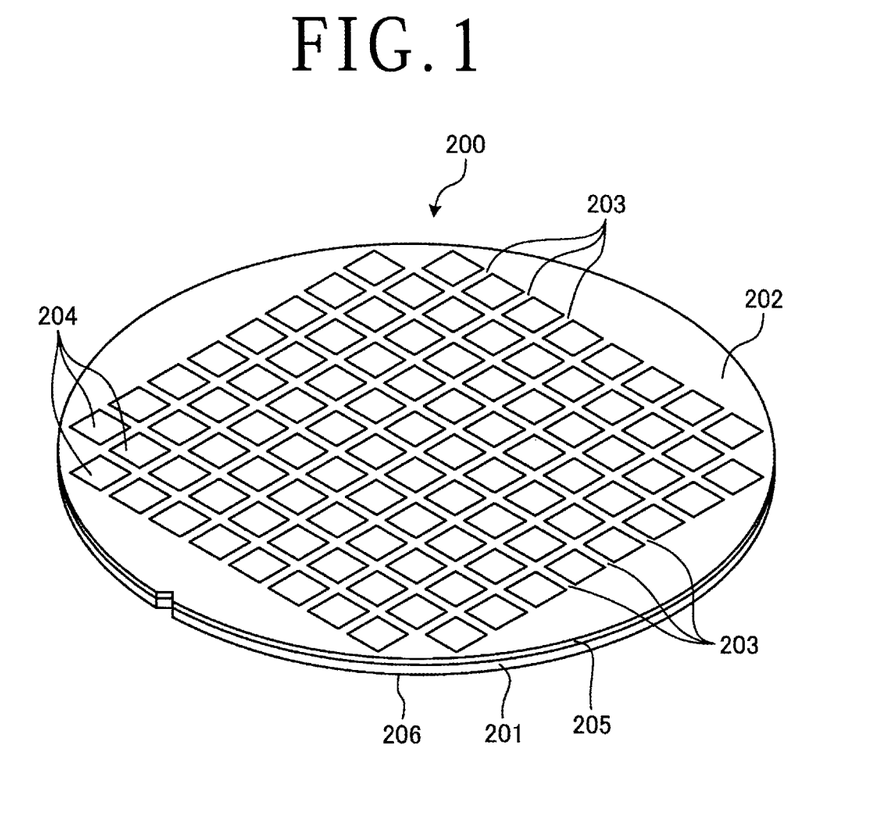
FIG. 1 is a perspective view of a wafer to be processed by a laser processing method according to an embodiment.
Figure 2:
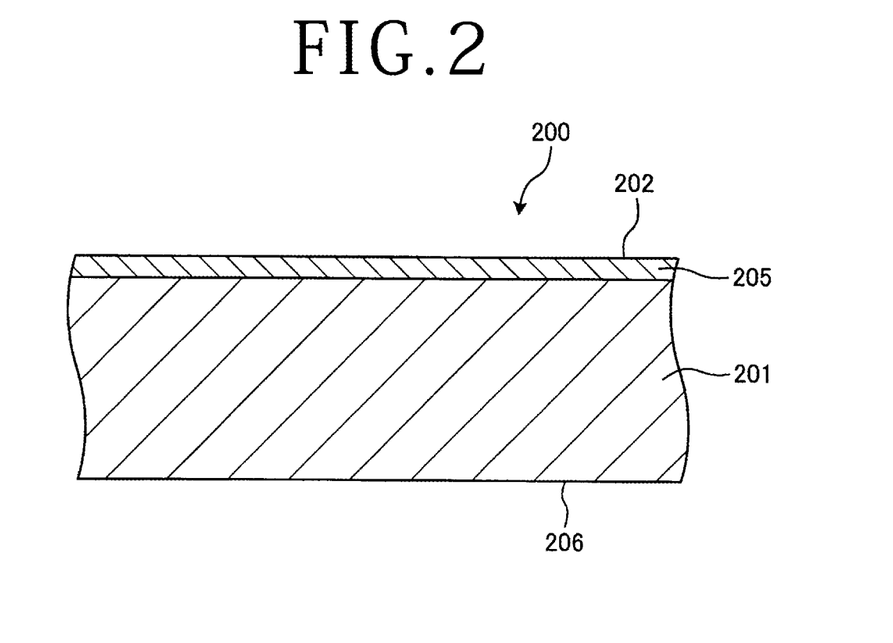
FIG. 2 is an enlarged sectional view of principal parts of the wafer depicted in FIG. 1.
Figure 3:
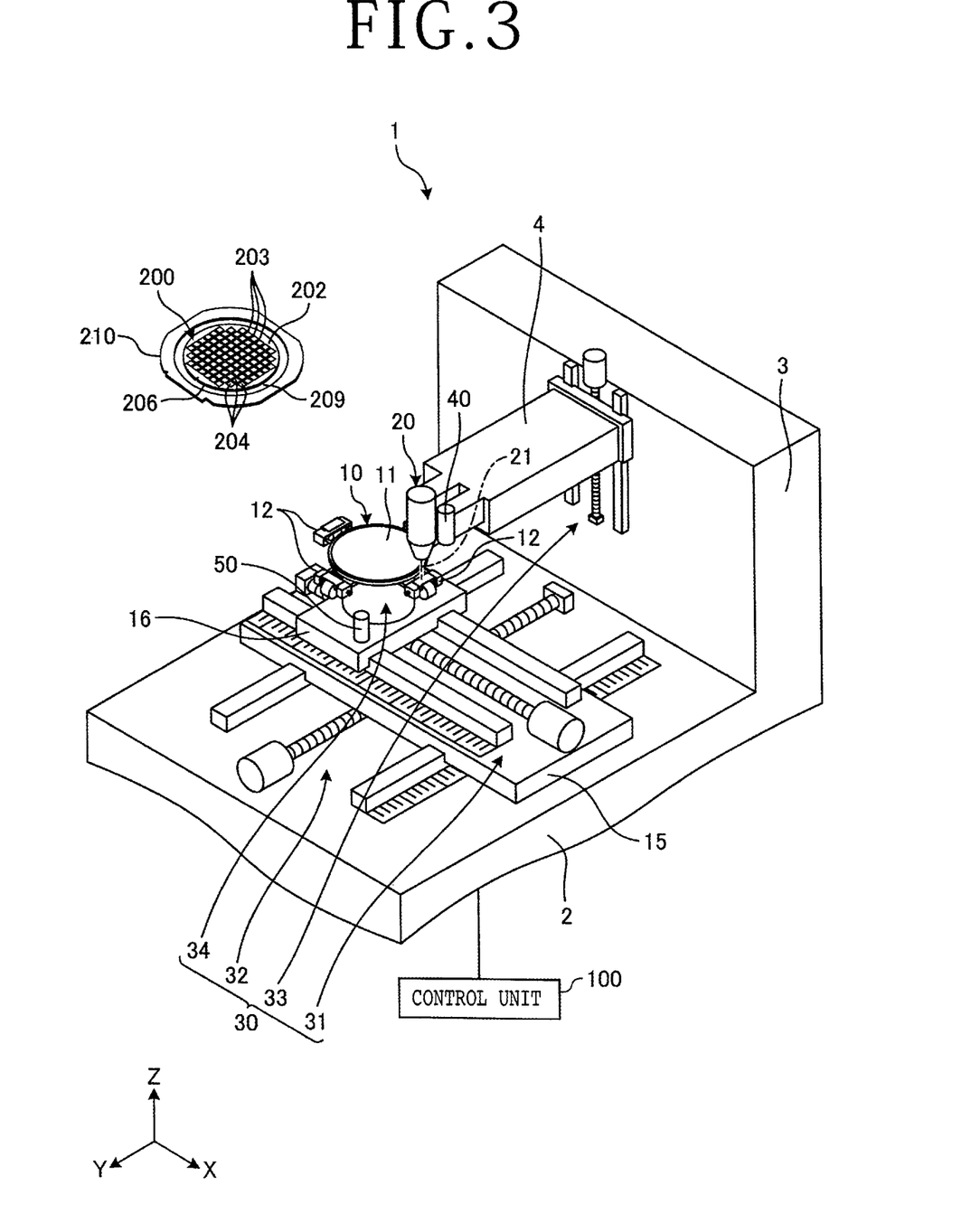
FIG. 3 is a perspective view depicting an example of a configuration of a laser processing apparatus that performs a part of the laser processing method according to the embodiment.
Figure 4:
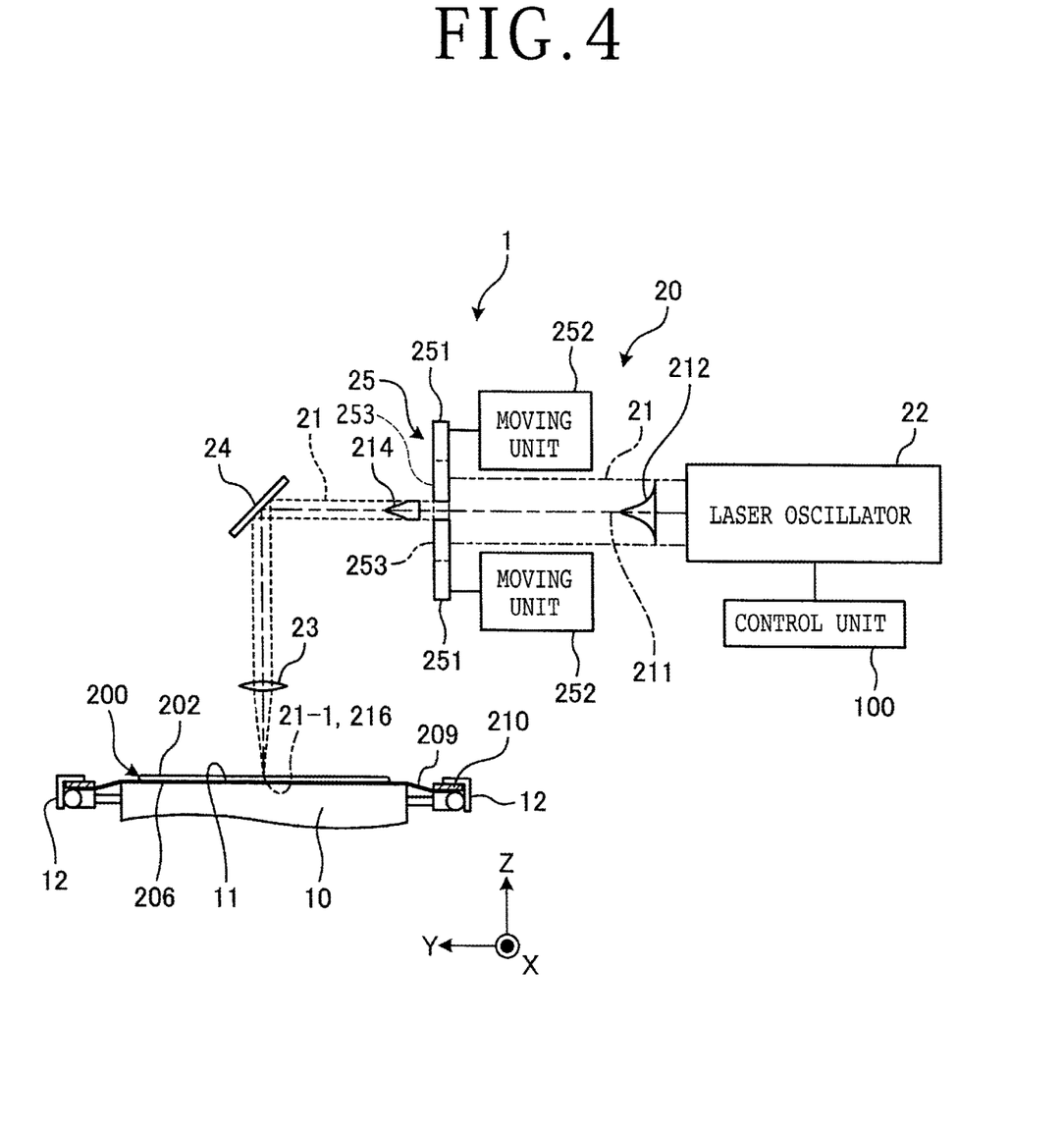
FIG. 4 is a diagram schematically depicting a configuration of a laser beam irradiating unit of the laser processing apparatus depicted in FIG. 3.
Figure 5:
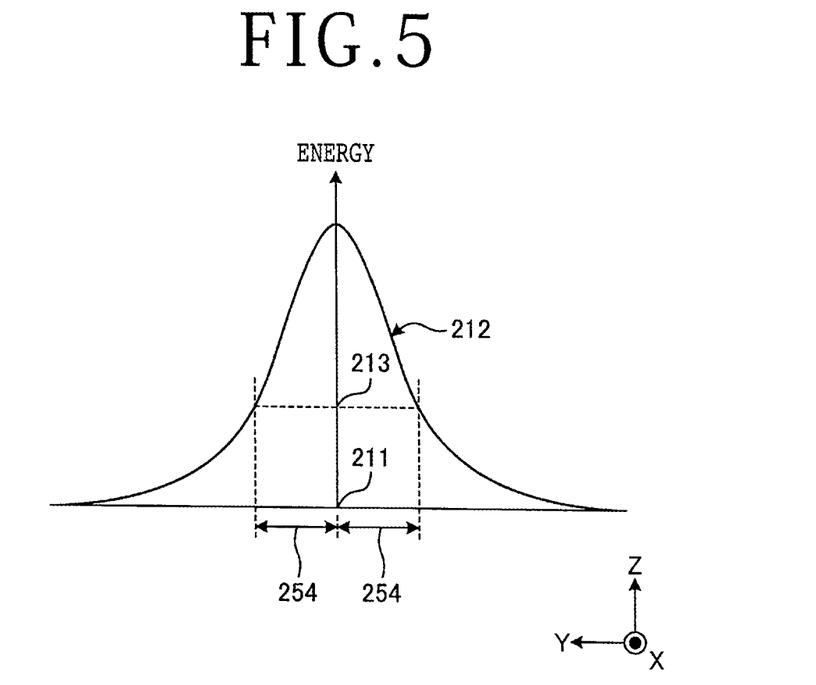
FIG. 5 is a diagram schematically depicting an energy distribution of a pulsed laser beam, the energy distribution having not yet been shaped by a mask of the laser beam irradiating unit depicted in FIG. 4.
Figure 6:
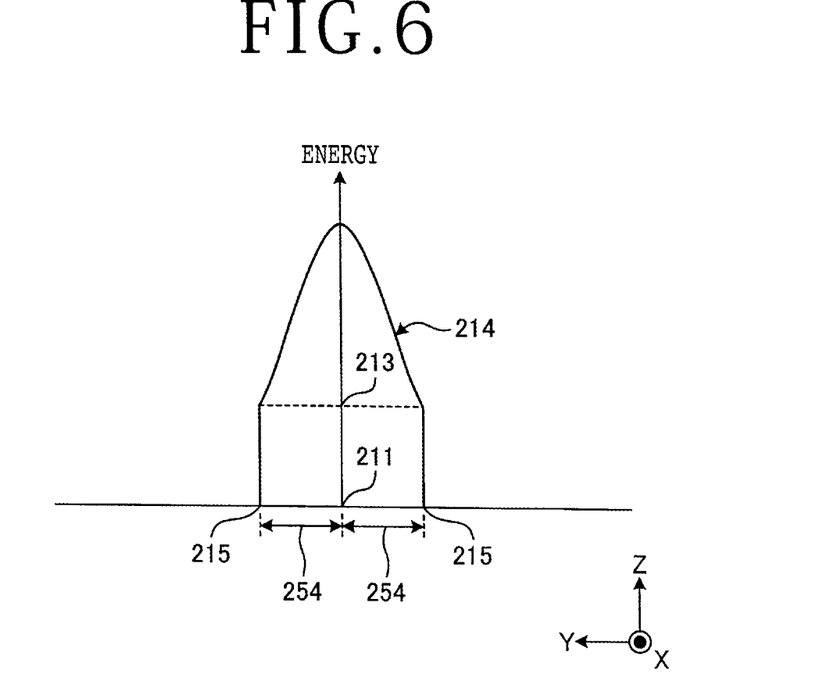
FIG. 6 is a diagram schematically depicting an energy distribution of the pulsed laser beam, the energy distribution having been shaped by the mask of the laser beam irradiating unit depicted in FIG. 4.
Figure 7:
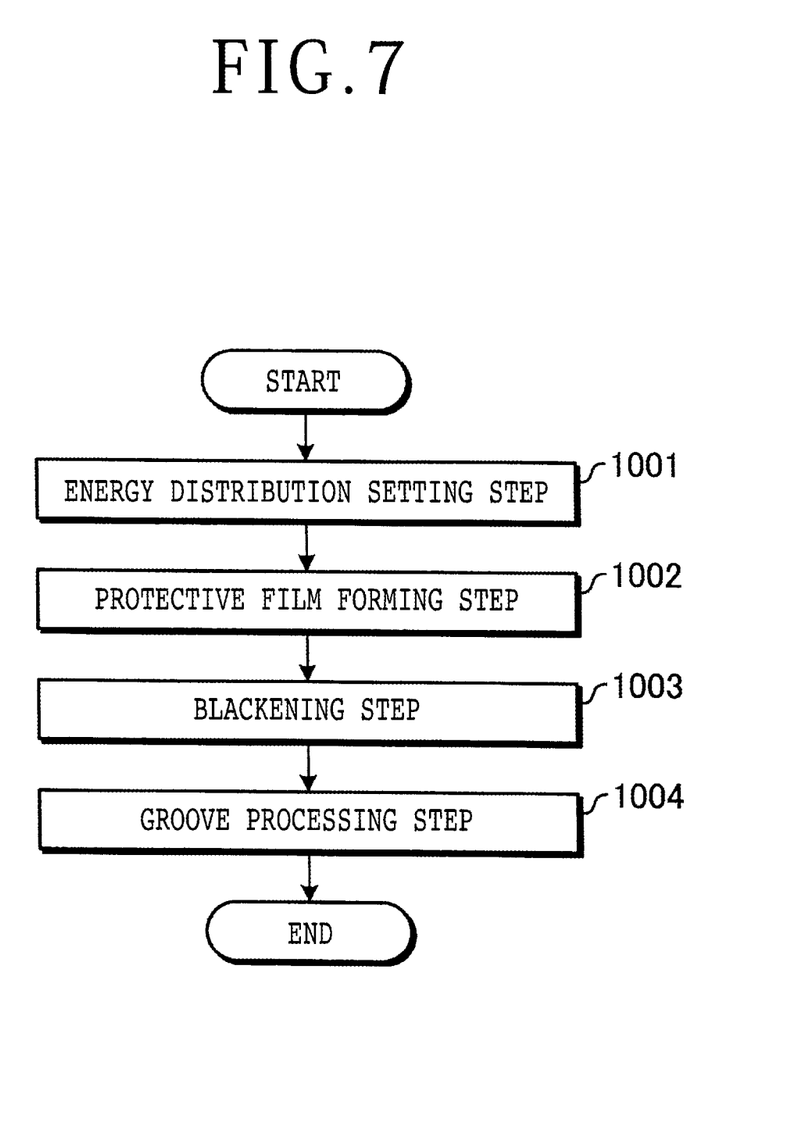
FIG. 7 is a flowchart depicting a flow of the laser processing method according to the embodiment.

A laser processing method according to an embodiment of the present invention will be described with reference to the drawings. FIG. 1 is a perspective view of a wafer to be processed by the laser processing method according to the embodiment. FIG. 2 is a sectional view of principal parts of the wafer depicted in FIG. 1. FIG. 3 is a perspective view depicting an example of a configuration of a laser processing apparatus that performs a part of the laser processing method according to the embodiment. FIG. 4 is a diagram schematically depicting a configuration of a laser beam irradiating unit of the laser processing apparatus depicted in FIG. 3. FIG. 5 is a diagram schematically depicting an energy distribution of a pulsed laser beam, the energy distribution having not yet been shaped by a mask of the laser beam irradiating unit depicted in FIG. 4. FIG. 6 is a diagram schematically depicting an energy distribution of the pulsed laser beam, the energy distribution having been shaped by the mask of the laser beam irradiating unit depicted in FIG. 4. FIG. 7 is a flowchart depicting a flow of the laser processing method according to the embodiment.

(Wafer)

The laser processing method according to the embodiment is a method of performing laser processing on a wafer 200 depicted in FIG. 1 and FIG. 2. The wafer 200 to be processed by the laser processing method according to the embodiment is a disk-shaped semiconductor wafer including silicon as a substrate 201. A plurality of planned dividing lines 203 intersecting each other are set on a top surface 202 of the wafer 200. Devices 204 are formed in regions demarcated by the planned dividing lines 203.

The devices 204 are, for example, an integrated circuit such as an integrated circuit (IC) or large scale integration (LSI), or an image sensor such as a charge coupled device (CCD) image sensor or a complementary metal oxide semiconductor (CMOS) image sensor.

In the embodiment, as depicted in FIG. 1 and FIG. 2, the wafer 200 has a functional layer 205 as organic films on the substrate 201. The functional layer 205 includes low dielectric constant insulator films (hereinafter referred to as Low-k films) formed by an inorganic material-based film of fluorinated silicon oxide (SiOF), silicon optical bench (SiOB) (borosilicate glass (BSG)), or the like, an organic material-based film such as a polyimide-based polymer film or a parylene-based polymer film, or a carbon containing silicon oxide (SiOCH), and circuit layers formed by an electrically conductive metal.

The Low-k films and the circuit layers are laminated to each other to form the devices 204. The circuit layers constitute circuits of the devices 204. Therefore, the devices 204 are formed by the mutually laminated Low-k films of the functional layer 205 laminated onto the substrate 201 and the circuit layers, of the functional layer 205, laminated between the Low-k films. Incidentally, the functional layer 205 in the planned dividing lines 203 is formed by the Low-k films formed in a plurality of layers, and does not include a conductor film except for a test element group (TEG). The TEG is an element for evaluation for finding a problem in design or in manufacturing which occurs in devices 204.

In the embodiment, as depicted in FIG. 3, the wafer 200 is supported within an opening of an annular frame 210 in a state in which an adhesive tape 209 having a disk shape of a larger diameter than the outside diameter of the wafer 200 and having the annular frame 210 affixed to an outer edge portion thereof is affixed to an undersurface 206 on the other side of the top surface 202. The wafer 200 is cut along the planned dividing lines 203, and is thereby divided into the individual devices 204.

(Laser Processing Apparatus)

The laser processing method according to the embodiment is partially performed by a laser processing apparatus 1 depicted in FIG. 3. The laser processing apparatus 1 depicted in FIG. 3 is an apparatus that irradiates the wafer 200 with a pulsed laser beam 21 in a pulse form, and thereby performs laser processing (corresponding to processing) on the wafer 200. As depicted in FIG. 3, the laser processing apparatus 1 includes a chuck table 10 having a holding surface 11 for holding the wafer 200, a laser beam irradiating unit 20, a moving unit 30, an imaging unit 40, and a control unit 100.

The chuck table 10 holds the wafer 200 by the holding surface 11 parallel with a horizontal direction. The holding surface 11 is in a disk shape formed of a porous ceramic or the like. The holding surface 11 is connected to a vacuum suction source not depicted via a vacuum suction path not depicted. The chuck table 10 holds under suction the wafer 200 mounted on the holding surface 11. A plurality of clamp units 12 that sandwich the annular frame 210 supporting the wafer 200 within the opening of the annular frame 210 are arranged on the periphery of the chuck table 10.

In addition, a rotational moving unit 34 of the moving unit 30 rotates the chuck table 10 about an axis parallel with a Z-axis direction orthogonal to the holding surface 11 and parallel with a vertical direction. An X-axis moving unit 31 of the moving unit 30 moves the chuck table 10 together with the rotational moving unit 34 in an X-axis direction parallel with the horizontal direction, and a Y-axis moving unit 32 of the moving unit 30 moves the chuck table 10 together with the rotational moving unit 34 in a Y-axis direction parallel with the horizontal direction and orthogonal to the X-axis direction. The moving unit 30 moves the chuck table 10 between a processing region below the laser beam irradiating unit 20 and a loading and unloading region in which the wafer 200 is separated from below the laser beam irradiating unit 20 and is loaded and unloaded.

The laser beam irradiating unit 20 is a unit that irradiates the wafer 200 held on the chuck table 10 with the pulsed laser beam 21 in a pulse form. In the embodiment, the laser beam irradiating unit 20 is laser beam irradiating means for performing laser processing on the wafer 200 by applying the pulsed laser beam 21 in a pulse form, the laser beam having a wavelength absorbable by the substrate 201 of the wafer 200 and being transparent to the functional layer 205 (which wavelength is 514 nm in the embodiment or may be 355 nm or 266 nm in the present invention).

In the embodiment, as depicted in FIG. 3, a part of the laser beam irradiating unit 20 is supported by a raising and lowering member 4 that is moved in the Z-axis direction by a Z-axis moving unit 33 of the moving unit 30, the Z-axis moving unit 33 being provided to an erect wall 3 erected from an apparatus main body 2.

A configuration of the laser beam irradiating unit 20 will next be described. As depicted in FIG. 4, the laser beam irradiating unit 20 includes a laser oscillator 22 that oscillates a laser in a pulse form for processing the wafer 200 and emits the pulsed laser beam 21, a condensing lens 23 that condenses the pulsed laser beam 21 emitted from the laser oscillator 22 onto the wafer 200 held on the holding surface 11 of the chuck table 10, at least one optical part 24 that is provided on an optical path of the pulsed laser beam 21 between the laser oscillator 22 and the condensing lens 23 and guides, to the condensing lens 23, the pulsed laser beam 21 emitted from the laser oscillator 22 from the laser oscillator 22, and a mask unit 25.

In the embodiment, as depicted in FIG. 5, an energy distribution 212 of the pulsed laser beam 21 emitted from the laser oscillator 22 is a Gaussian distribution in which energy on a center 211 of the optical path of the pulsed laser beam 21 is strongest and energy gradually decreases with increasing distance from the center 211. Incidentally, an axis of abscissas in FIG. 5 indicates positions in the Y-axis direction, and the center of the axis of abscissas indicates the center 211 of the optical path of the pulsed laser beam 21. In addition, an axis of ordinates in FIG. 5 indicates energy. In addition, while FIG. 5 depicts the energy distribution 212 of the pulsed laser beam 21 at positions parallel with the Y-axis direction, the energy distribution 212 of the pulsed laser beam 21 is a Gaussian distribution also at positions parallel with the X-axis direction.

The condensing lens 23 is disposed at a position opposed in the Z-axis direction to the holding surface 11 of the chuck table 10. The condensing lens 23 transmits the pulsed laser beam 21 emitted from the laser oscillator 22, and condenses the pulsed laser beam 21 to a condensing point 21-1. In the embodiment, the laser beam irradiating unit 20 includes, as the optical part 24, a mirror that reflects the pulsed laser beam 21. However, in the present invention, the optical part 24 is not limited to the mirror.

The mask unit 25 modifies (changes) the energy distribution of the pulsed laser beam 21 emitted from the laser oscillator 22. The mask unit 25 is provided on the optical path of the pulsed laser beam 21 between the laser oscillator 22 and the optical part 24. In the embodiment, as depicted in FIG. 4, the mask unit 25 includes a pair of Y-axis direction mask members 251, a pair of moving units 252, a pair of X-axis direction mask members 253, and a pair of X-axis direction moving units not depicted.

The pair of Y-axis direction mask members 251 are formed by a material that interrupts (that is, does not transmit) the pulsed laser beam 21. The pair of Y-axis direction mask members 251 are arranged at an interval from each other in the Y-axis direction. The center 211 of the optical path of the pulsed laser beam 21 between the laser oscillator 22 and the optical part 24 is positioned between the pair of Y-axis direction mask members 251. The pair of Y-axis direction mask members 251 are provided in such a manner as to be movable in a direction of approaching each other or separating from each other in the Y-axis direction.

The moving units 252 move the pair of Y-axis direction mask members 251 in a direction of approaching each other or separating from each other in the Y-axis direction. In the embodiment, the moving units 252 are provided in such a manner as to correspond to the Y-axis direction mask members 251 on a one-to-one basis, and the moving units 252 move the corresponding Y-axis direction mask members 251 in the Y-axis direction.

The pair of X-axis direction mask members 253 are formed by a material that interrupts (that is, does not transmit) the pulsed laser beam 21. The pair of X-axis direction mask members 253 are arranged at an interval from each other in the X-axis direction. The center 211 of the optical path of the pulsed laser beam 21 between the laser oscillator 22 and the optical part 24 is positioned between the pair of X-axis direction mask members 253. The pair of X-axis direction mask members 253 are provided in such a manner as to be movable in a direction of approaching each other or separating from each other in the X-axis direction.

The X-axis direction moving units move the pair of X-axis direction mask members 253 in a direction of approaching each other or separating from each other in the X-axis direction. In the embodiment, the X-axis direction moving units are provided in such a manner as to correspond to the X-axis direction mask members 253 on a one-to-one basis, and the X-axis direction moving units move the corresponding X-axis direction mask members 253 in the X-axis direction. It is to be noted that the X-axis direction and the Y-axis direction described in the description of the mask unit 25 refer to the X-axis direction and the Y-axis direction of the pulsed laser beam 21 applied to the wafer 200 held on the chuck table 10.

The pair of Y-axis direction mask members 251 and the pair of X-axis direction mask members 253 of the mask unit 25 block parts of the pulsed laser beam 21 emitted from the laser oscillator 22 which parts are separated from the center 211 (base parts of the Gaussian distribution). The mask unit 25 thereby modifies the energy distribution 212 depicted in FIG. 5 of the pulsed laser beam 21 emitted from the laser oscillator 22 to an energy distribution 214 depicted in FIG. 6 in which energy decreases sharply from a value 213 on the energy distribution 212 depicted in FIG. 5 to zero at positions separated from the center 211 of the pulsed laser beam 21 by a distance 254 of the mask members 251 and 253 from the center 211 of the pulsed laser beam 21.

In addition, the mask unit 25 changes positions 215 of the energy distribution 214 depicted in FIG. 6 in which energy decreases sharply from the value 213 on the energy distribution 212 depicted in FIG. 5 to zero by changing the distances 254 of the pair of Y-axis direction mask members 251 from the center 211 of the pulsed laser beam 21 by the moving units 252 and changing distances of the pair of X-axis direction mask members 253 from the center 211 of the pulsed laser beam 21 by the X-axis direction moving units. Incidentally, the value 213 on the energy distribution 214 at the positions 215 at which energy sharply decreases to zero will hereinafter be described as a boundary value. Thus, the mask unit 25 modifies the energy distribution 212 depicted in FIG. 5 as the Gaussian distribution of the pulsed laser beam 21 to the energy distribution 214 depicted in FIG. 6 as a distribution in which base parts are vertical.

Thus, in the embodiment, the mask unit 25 sets an interval in the X-axis direction between the pair of X-axis direction mask members 253 narrower than an interval in the Y-axis direction between the pair of Y-axis direction mask members 251. The mask unit 25 thereby forms a spot 216 of the pulsed laser beam 21 condensed by the condensing lens 23 into a rectangular shape having a longitudinal direction parallel with the Y-axis direction and a lateral direction parallel with the X-axis direction. Incidentally, an axis of abscissas in FIG. 6 indicates positions in the Y-axis direction, and the center of the axis of abscissas indicates the center 211 of the pulsed laser beam 21. In addition, an axis of ordinates in FIG. 6 indicates energy. In addition, while FIG. 6 depicts the energy distribution 214 of the pulsed laser beam 21 at positions parallel with the Y-axis direction, the energy distribution 214 of the laser beam is a distribution similar to that of FIG. 6 also at positions parallel with the X-axis direction.

Incidentally, while the laser beam irradiating unit 20 in the embodiment includes the mask unit 25 as means for modifying the energy distribution of the pulsed laser beam 21, a digital micro-mirror device (DMD) may be provided, in place of the mask unit 25, as means for modifying the energy distribution of the pulsed laser beam 21 in the present invention.

The moving unit 30 moves the laser beam irradiating unit 20 and the chuck table 10 relative to each other in the X-axis direction, in the Y-axis direction, in the Z-axis direction, and about an axis parallel with the Z-axis direction. The X-axis direction and the Y-axis direction are directions parallel with the holding surface 11. The X-axis direction is a direction parallel with one planned dividing line 203 of the wafer 200 held on the chuck table 10, and is what is generally called a processing feed direction in which the laser processing apparatus 1 processing-feeds the chuck table 10 when the laser processing apparatus 1 performs laser processing on the wafer 200. The Y-axis direction is orthogonal to the X-axis direction, and is what is generally called an indexing feed direction in which the laser processing apparatus 1 indexing-feeds the chuck table 10 when the laser processing apparatus 1 performs the laser processing on the wafer 200.

As depicted in FIG. 3, the moving unit 30 includes the X-axis moving unit 31 as a processing feed unit that moves the chuck table 10 in the X-axis direction, the Y-axis moving unit 32 as an indexing feed unit that moves the chuck table 10 in the Y-axis direction, the Z-axis moving unit 33 that moves, in the Z-axis direction, the condensing lens 23 included in the laser beam irradiating unit 20, and the rotational moving unit 34 that rotates the chuck table 10 about an axis parallel with the Z-axis direction.

The Y-axis moving unit 32 is a unit that indexing-feeds the chuck table 10 and the laser beam irradiating unit 20 relative to each other. In the embodiment, the Y-axis moving unit 32 is installed on the apparatus main body 2 of the laser processing apparatus 1. The Y-axis moving unit 32 supports a moving plate 15 supporting the X-axis moving unit 31 such that the moving plate 15 is movable in the Y-axis direction.

The X-axis moving unit 31 is a unit that processing-feeds the chuck table 10 and the laser beam irradiating unit 20 relative to each other. The X-axis moving unit 31 is installed on the moving plate 15. The X-axis moving unit 31 supports a second moving plate 16 supporting the rotational moving unit 34 that rotates the chuck table 10 about an axis parallel with the Z-axis direction such that the second moving plate 16 is movable in the X-axis direction. The Z-axis moving unit 33 is installed on the erect wall 3, and supports the raising and lowering member 4 in such a manner as to be movable in the Z-axis direction.

The X-axis moving unit 31, the Y-axis moving unit 32, and the Z-axis moving unit 33 include a well-known ball screw provided in such a manner as to be rotatable about an axis, a well-known pulse motor that rotates the ball screw about the axis, and well-known guide rails that support the moving plate 15 or 16 in such a manner as to be movable in the X-axis direction or the Y-axis direction and that support the raising and lowering member 4 in such a manner as to be movable in the Z-axis direction.

In addition, the laser processing apparatus 1 includes an X-axis direction position detecting unit, not depicted, for detecting the position in the X-axis direction of the chuck table 10, a Y-axis direction position detecting unit, not depicted, for detecting the position in the Y-axis direction of the chuck table 10, and a Z-axis direction position detecting unit that detects the position in the Z-axis direction of the condensing lens 23 included in the laser beam irradiating unit 20. Each position detecting unit outputs a detection result to the control unit 100.

The imaging unit 40 images the wafer 200 held on the chuck table 10. The imaging unit 40 includes an imaging element such as a CCD imaging element or a CMOS imaging element that images the wafer 200 held on the chuck table 10. In the embodiment, the imaging unit 40 is attached to a distal end of the raising and lowering member 4, and is disposed at a position aligned in the X-axis direction with the condensing lens 23 of the laser beam irradiating unit 20. The imaging unit 40 images the wafer 200, thereby obtains an image for carrying out alignment that aligns the wafer 200 and the laser beam irradiating unit 20 with each other, and outputs the obtained image to the control unit 100.

In addition, in the embodiment, the laser processing apparatus 1 includes a power meter 50. The power meter 50 measures the energy distribution of the pulsed laser beam 21 applied by the laser beam irradiating unit 20 when the pulsed laser beam 21 is applied from the laser beam irradiating unit 20. The power meter 50 outputs the measured energy distribution to the control unit 100. In the embodiment, the power meter 50 is installed on the second moving plate 16, and can be opposed in the Z-axis direction to the condensing lens 23 of the laser beam irradiating unit 20 by the moving unit 30.

The control unit 100 makes the laser processing apparatus 1 perform laser processing operation on the wafer 200 by controlling each of the above-described constituent elements of the laser processing apparatus 1. Incidentally, the control unit 100 is a computer including an arithmetic processing device having a microprocessor such as a central processing unit (CPU), a storage device having a memory such as a read only memory (ROM) or a random access memory (RAM), and an input-output interface device. The arithmetic processing device of the control unit 100 implements functions of the control unit 100 by performing arithmetic processing according to a computer program stored in the storage device and outputting control signals for controlling the laser processing apparatus 1 to the above-described constituent elements of the laser processing apparatus 1 via the input-output interface device.

In addition, the control unit 100 is connected with a display unit 110 formed by a liquid crystal display device or the like that displays a state of processing operation, an image, or the like and an input unit not depicted that is used when an operator registers processing content information or the like. The input unit is formed by at least one of a touch panel provided to the display unit 110 and an external input device such as a keyboard.

In addition, the control unit 100 is also used to set processing conditions of the laser processing apparatus 1. The processing conditions, for example, include energy of the pulsed laser beam 21, a repetition frequency of the pulsed laser beam 21 in a pulse form, an overlap ratio to be described later, a processing threshold value of the functional layer 205, a moving speed in the X-axis direction of the chuck table 10 at a time of laser processing (which moving speed will hereinafter be written as a processing feed speed), and the like. Incidentally, the energy of the pulsed laser beam 21 refers to energy on the center 211 of the energy distributions 212 and 214. In addition, the control unit 100 has a function of calculating relation between the distances 254 of the mask members 251 and 253 from the center 211 of the pulsed laser beam 21 and the boundary value 213 of the energy distribution 214, according to the energy of the pulsed laser beam 21, a function of calculating a width WX (depicted in FIG. 9) in the X-axis direction of the spot 216 on the basis of the processing threshold value and the like, and a function of calculating the processing feed speed on the basis of the overlap ratio, the width WX, the repetition frequency, and the like and inputting the processing feed speed as a processing condition. These functions are implemented by the arithmetic processing device by executing a program stored in the storage device. In addition, in the present invention, the above-described functions is not required to be implemented by executing the program but may also be implemented by calculation by a worker.

The laser processing method according to the embodiment is a method of performing laser processing on the wafer 200 having the functional layer 205 as organic films on the substrate 201. The laser processing method according to the embodiment includes a processing operation of the laser processing apparatus 1. As depicted in FIG. 7, the laser processing method according to the embodiment includes an energy distribution setting step 1001, a protective film forming step 1002, a blackening step 1003, and a groove processing step 1004.

(Energy Distribution Setting Step)

The energy distribution setting step 1001 is a step of adjusting the distances of the mask members 251 and 253 from the center 211 and thereby setting the boundary value 213 of the energy distribution 214. In the laser processing apparatus 1 having the configuration described above, the control unit 100 receives processing conditions input by the operator by operating the input unit or the like. Incidentally, the processing conditions include the processing threshold value of the functional layer 205 of the wafer 200, the energy, the repetition frequency, and the overlap ratio of the pulsed laser beam 21 in the blackening step 1003, the energy, the repetition frequency, and the overlap ratio of the pulsed laser beam 21 in the groove processing step 1004, and the like.

In the embodiment, the control unit 100 of the laser processing apparatus 1 calculates the distances 254 of the mask members 251 and 253 from the center 211 at which distances the boundary value 213 is the processing threshold value of the functional layer 205 of the wafer 200 on the basis of the processing threshold value, the energy of the pulsed laser beam 21 in the blackening step 1003, and the like, and sets the distance 254 of each of the mask members 251 and 253 from the center 211 to the distance at which the boundary value 213 is the processing threshold value, by controlling the moving unit 252.

Incidentally, in the embodiment, the processing conditions include the processing threshold value of the functional layer 205 of the wafer 200. However, in a case where the processing threshold value of the functional layer 205 is not known, the wafer 200 may be held under suction on the chuck table 10, the pulsed laser beam 21 of various energies for the wafer 200 may be applied with the condensing point 21-1 set in the functional layer 205, and the energy of the pulsed laser beam 21 applied when the functional layer 205 is carbonized and blackened may be set as the processing threshold value. Incidentally, whether or not the functional layer 205 is blackened may be visually checked by the operator of the laser processing apparatus 1, or may be checked by performing imaging by the imaging unit 40 and performing well-known image processing. Incidentally, when the functional layer 205 is blackened, a property of absorbing the pulsed laser beam 21 by the functional layer 205 is improved more than before the functional layer 205 is blackened. Thus, the processing threshold value referred to in the present invention refers to the value of the energy of the pulsed laser beam 21 at which value the functional layer 205 can be carbonized and blackened to such a degree as to be able to absorb the pulsed laser beam 21, by applying the pulsed laser beam 21 of energy equal to or higher than the processing threshold value with the condensing point 21-1 set in the functional layer 205.

(Protective Film Forming Step)

Figure 8:
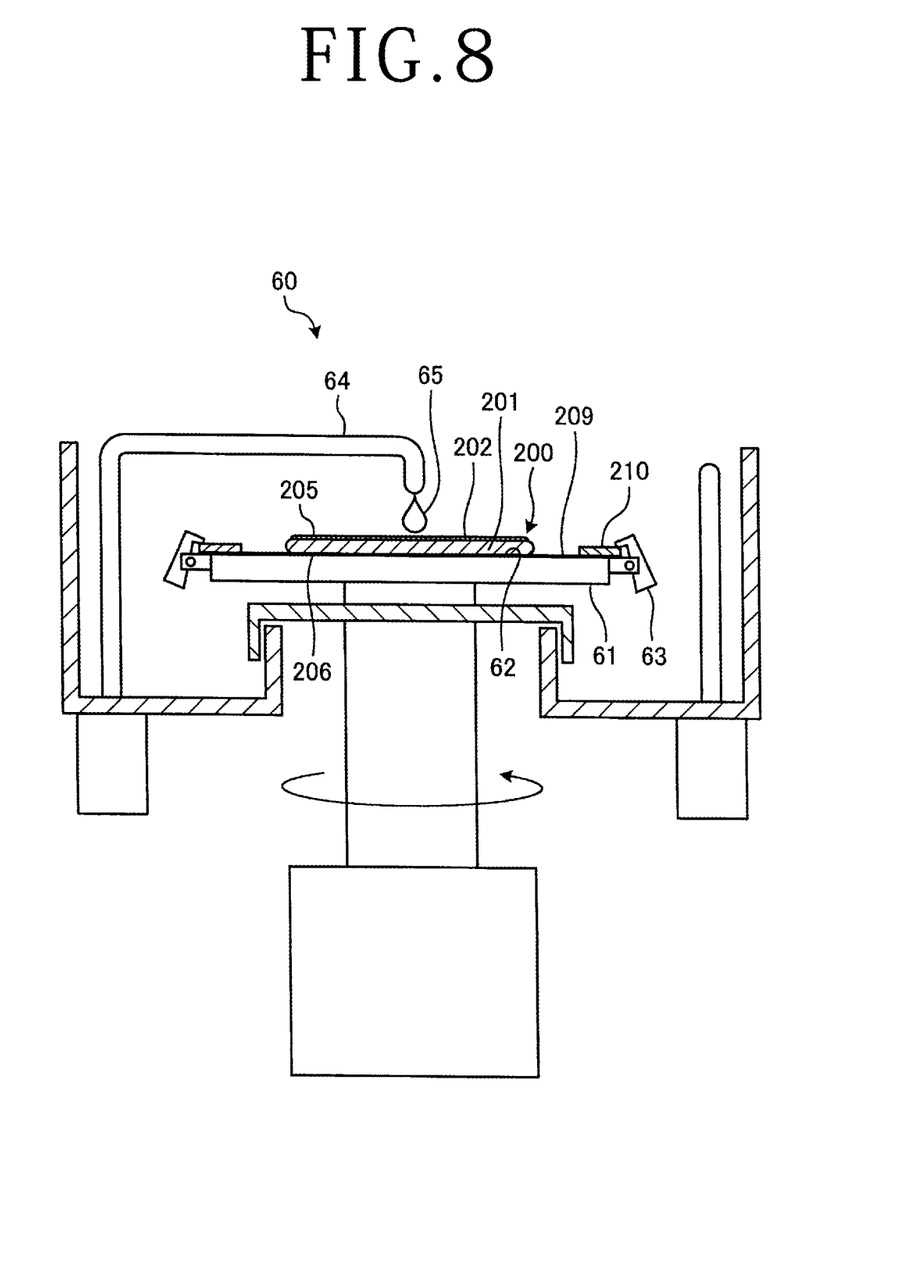
FIG. 8 is a side view schematically depicting, partly in section, a protective film forming step of the laser processing method depicted in FIG. 7.

FIG. 8 is a side view schematically depicting, partly in section, the protective film forming step of the laser processing method depicted in FIG. 7. The protective film forming step 1002 is a step of coating the top surface 202 side of the wafer 200 with a water-soluble protective film.

In the protective film forming step 1002, a protective film coating apparatus 60 holds under suction the undersurface 206 side of the wafer 200 on a holding surface 62 of a spinner table 61 via the adhesive tape 209, and clamps the annular frame 210 by clamp units 63 provided on the periphery of the spinner table 61. In the protective film forming step 1002, as depicted in FIG. 8, the protective film coating apparatus 60 rotates the spinner table 61 about an axis, and drops a water-soluble resin 65 onto the top surface 202 of the wafer 200 from a water-soluble resin supply nozzle 64.

The dropped water-soluble resin 65 flows from a central side to an outer circumference side on the top surface 202 of the wafer 200 due to a centrifugal force produced by rotation of the spinner table 61. The whole of the top surface 202 of the wafer 200 is thus coated with the water-soluble resin 65.

Incidentally, the water-soluble resin 65 is, for example, a water-soluble resin such as polyvinyl alcohol (PVA) or polyvinylpyrrolidone (PVP). In the protective film forming step 1002, a water-soluble protective film that covers the whole of the top surface 202 of the wafer 200 is formed by curing the water-soluble resin 65 applied to the whole of the top surface 202 of the wafer 200.

(Blackening Step)

Figure 9:
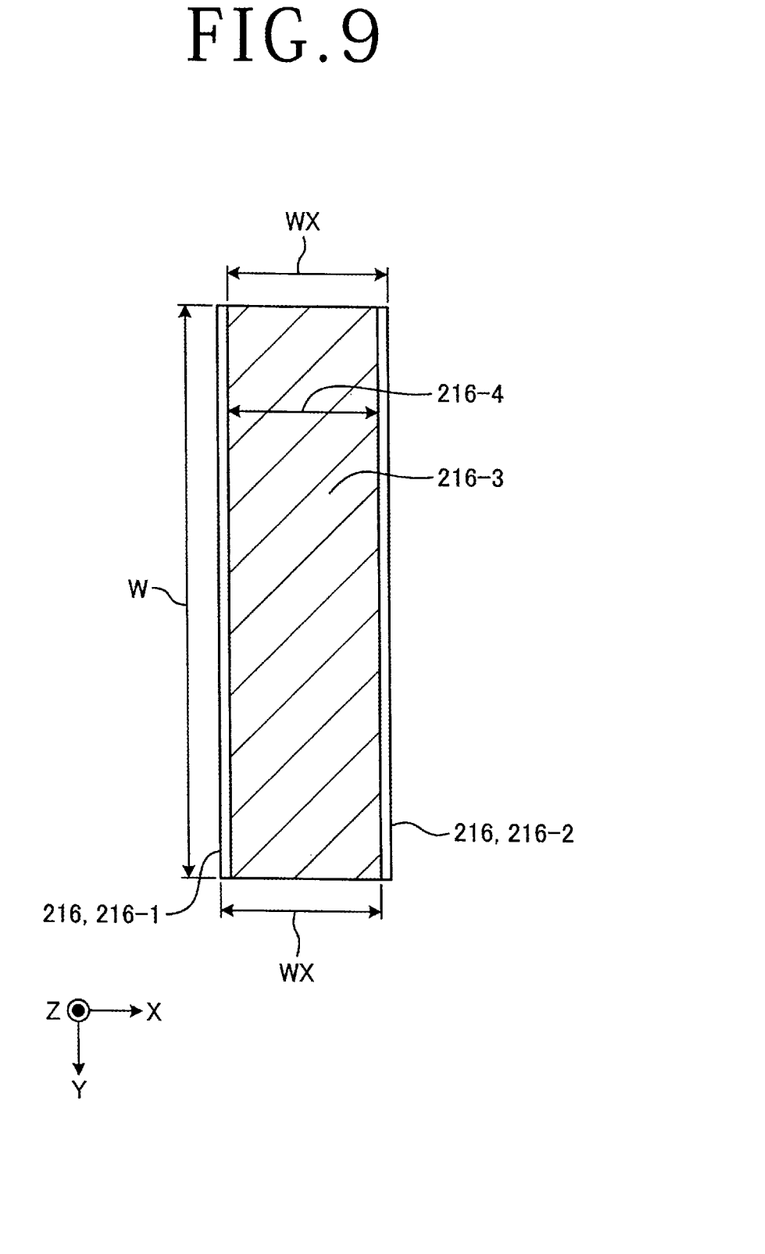
FIG. 9 is a diagram of assistance in schematically explaining an overlap ratio of the pulsed laser beam in the laser processing method depicted in FIG. 7.
Figure 10:
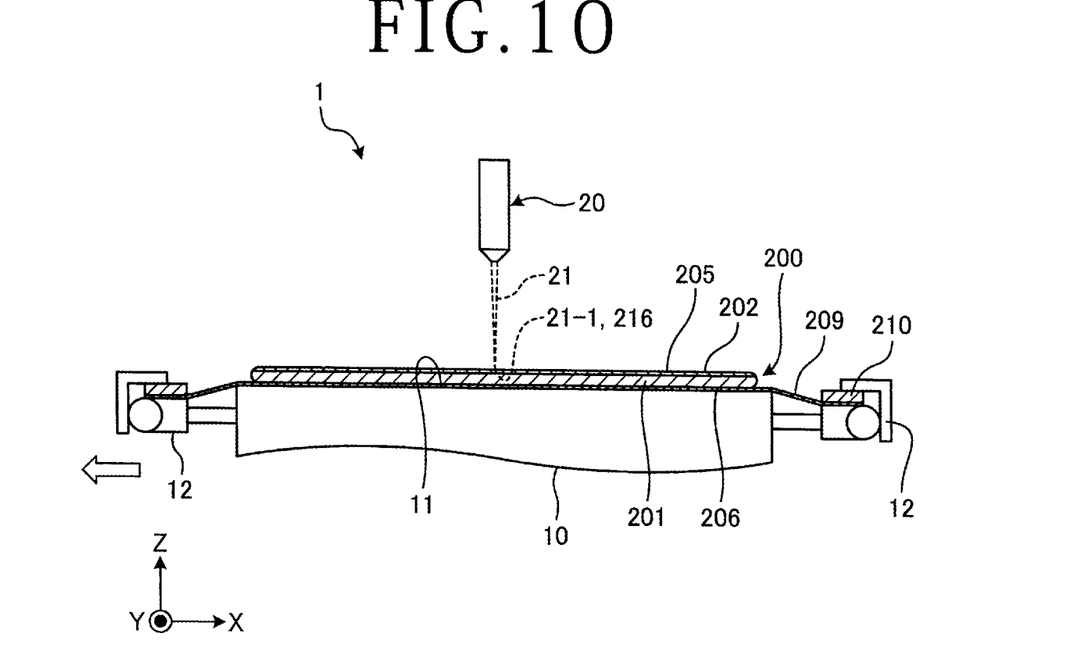
FIG. 10 is a side view schematically depicting, partly in section, a blackening step of the laser processing method depicted in FIG. 7.

FIG. 9 is a diagram of assistance in schematically explaining the overlap ratio of the pulsed laser beam in the laser processing method depicted in FIG. 7. FIG. 10 is a side view schematically depicting, partly in section, the blackening step of the laser processing method depicted in FIG. 7. Incidentally, the water-soluble protective film is omitted in FIG. 10.

The blackening step 1003 is a step of generating the pulsed laser beam 21 of a wavelength transparent to the functional layer 205 by the laser oscillator 22 and blackening the functional layer 205 by irradiating the functional layer 205 with the pulsed laser beam 21 of energy equal to or higher than the processing threshold value at which the functional layer 205 is processed such that the overlap ratio of the pulsed laser beam 21 successively applied to the functional layer 205 is equal to or more than 90% and less than 100%.

Incidentally, the overlap ratio refers to a ratio (%) of a region 216-3 (indicated by hatching in FIG. 9) to the area of each of the spots 216-1 and 216-2, in which region, of spots 216 of the pulsed laser beam 21 depicted in FIG. 9 which is applied successively and one after another, the spots 216 being on the functional layer 205 of the wafer 200, a preceding spot 216 (hereinafter written as a spot 216-1) of the pulsed laser beam 21 and a subsequent spot 216 (hereinafter written as a spot 216-2) of the pulsed laser beam 21 overlap each other.

Here, letting S be the processing feed speed (mm/sec), letting WX (depicted in FIG. 9) be the width (mm) in the X-axis direction of the spots 216-1 and 216-2, and letting F be the repetition frequency (Hz) of the pulsed laser beam 21, the overlap ratio O (%) is defined by the following Equation 1.

$$O=[1-\{S/(WX \times F)\}] \times 100 \quad \text{Equation 1}$$

Incidentally, when the overlap ratio O is less than 90%, the functional layer 205 cannot be blackened, and film peeling of the functional layer 205 from the substrate 201 cannot be suppressed at a time of performing the groove processing step 1004. In addition, when the overlap ratio O is 100%, the pulsed laser beam 21 continues to be applied to a same position at all times. In addition, the overlap ratio O is preferably equal to or more than 95% in order to be able to blacken the functional layer 205 and excellently suppress the film peeling of the functional layer 205 from the substrate 201 at a time of performing the groove processing step 1004.

In the blackening step 1003, in the laser processing apparatus 1, the wafer 200 having the top surface 202 coated with the water-soluble protective film is mounted on the holding surface 11 of the chuck table 10 positioned in the loading and unloading region via the adhesive tape 209. In the embodiment, in the blackening step 1003, when the control unit 100 receives a processing operation start instruction of the operator from the input unit, the laser processing apparatus 1 starts processing operation, holds under suction the wafer 200 on the holding surface 11 of the chuck table 10 via the adhesive tape 209, and clamps the annular frame 210 by the clamp units 12.

In addition, in the blackening step 1003, the control unit 100 of the laser processing apparatus 1 calculates the width WX of the spots 216-1 and 216-2 on the basis of the processing threshold value, the calculated distance 254, and the like, and calculates the processing feed speed S that satisfies Equation 1 on the basis of the overlap ratio O and the repetition frequency F defined in the processing conditions. In the blackening step 1003, in the laser processing apparatus 1, the moving unit 30 moves the chuck table 10 to the processing region, and the imaging unit 40 images the wafer 200. The laser processing apparatus 1 carries out alignment on the basis of an image obtained by the imaging of the imaging unit 40.

In the embodiment, the laser processing apparatus 1 sets the condensing point 21-1 of the pulsed laser beam 21 in the functional layer 205 on the basis of the processing conditions, the calculated processing feed speed S, and the like, and as depicted in FIG. 10, the laser beam irradiating unit 20 irradiates a planned dividing line 203 with the pulsed laser beam 21 in a pulse form while the moving unit 30 moves the wafer 200 held on the chuck table 10 and the condensing point 21-1 of the pulsed laser beam 21 applied by the laser beam irradiating unit 20 relative to each other at the calculated processing feed speed S along the planned dividing line 203 in such a manner as to achieve the overlap ratio O set in the processing conditions. The laser processing apparatus 1 thereby performs laser processing on the wafer 200. The laser processing apparatus 1 thus blackens the functional layer 205 on all of the planned dividing lines 203.

Incidentally, in the embodiment, in the blackening step 1003, the wavelength of the pulsed laser beam 21 is set to 514 nm, and the energy of the pulsed laser beam 21 is set to 0.2 µJ or higher and 2 µJ or lower (preferably, 0.2 µJ or higher and 0.5 µJ or lower).

In addition, in the embodiment, in the blackening step 1003, for example, the overlap ratio O is 99% when the width WX (depicted in FIG. 9) in the X-axis direction of each of the spots 216-1 and 216-2 is set to 5 µm, the repetition frequency F of the pulsed laser beam 21 is set to 1 MHz, and the processing feed speed S is set to 50 mm/sec. When the overlap ratio O is 99%, a width 216-4 (depicted in FIG. 9) in the X-axis direction of the region 216-3 is 4.95 µm. In the embodiment, in the blackening step 1003, laser processing is performed with an overlap ratio O of 99%, for example.

In addition, in the blackening step 1003, the pulsed laser beam 21 applied to the functional layer 205 is modified from the energy distribution 212 depicted in FIG. 5 to the energy distribution 214 depicted in FIG. 6. Thus, in the blackening step 1003, because the pulsed laser beam 21 applied to the functional layer 205 is modified from the energy distribution 212 depicted in FIG. 5 to the energy distribution 214 depicted in FIG. 6 in which base parts are vertical, the pulsed laser beam 21 of energy lower than the processing threshold value is prevented from being transmitted through the functional layer 205 and applied to the substrate 201.

(Groove Processing Step)

Figure 11:
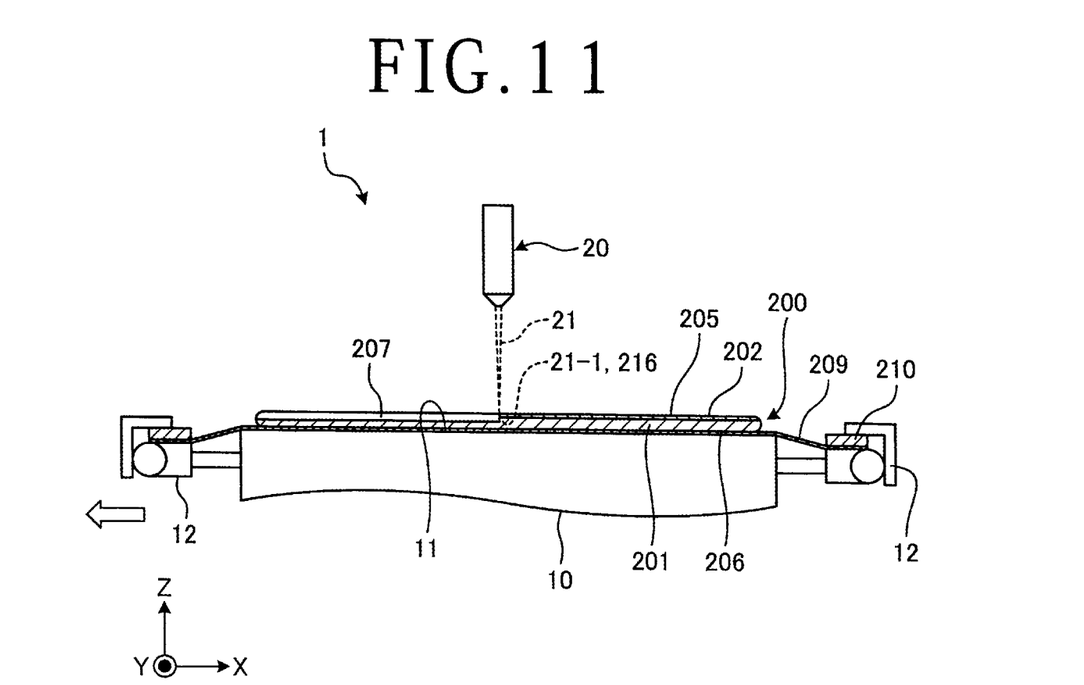
FIG. 11 is a side view schematically depicting, partly in section, a groove processing step of the laser processing method depicted in FIG. 7.

FIG. 11 is a side view schematically depicting, partly in section, the groove processing step of the laser processing method depicted in FIG. 7. Incidentally, the water-soluble protective film is omitted in FIG. 11. The groove processing step 1004 is a step of forming a laser-processed groove 207 by irradiating the blackened functional layer 205 with the pulsed laser beam 21 and making the blackened functional layer 205 absorb the pulsed laser beam 21 after performing the blackening step 1003.

In the embodiment, in the groove processing step 1004, the laser processing apparatus 1 removes the functional layer 205 and the surface of the substrate 201 by irradiating the blackened functional layer 205 with the pulsed laser beam 21 such that the overlap ratio O exceeds 0% and is less than 80%. The laser processing apparatus 1 thereby forms the laser-processed groove 207. In the groove processing step 1004, the control unit 100 of the laser processing apparatus 1 calculates the processing feed speed S satisfying Equation 1 on the basis of the overlap ratio O and the repetition frequency F defined in the processing conditions.

In the groove processing step 1004, the laser processing apparatus 1 sets the condensing point 21-1 of the pulsed laser beam 21 in the blackened functional layer 205 on the basis of the processing conditions and the calculated processing feed speed S, and as depicted in FIG. 11, the laser beam irradiating unit 20 irradiates a planned dividing line 203 with the pulsed laser beam 21 in a pulse form while the moving unit 30 moves the wafer 200 held on the chuck table 10 and the condensing point 21-1 of the pulsed laser beam 21 applied by the laser beam irradiating unit 20 relative to each other at the calculated processing feed speed S along the planned dividing line 203 in such a manner as to achieve the overlap ratio O set in the processing conditions. In the groove processing step 1004, the laser processing apparatus 1 performs laser processing, that is, ablation processing on the wafer 200 along the planned dividing line 203 by applying the pulsed laser beam 21 of a wavelength absorbable by the blackened functional layer 205 and the substrate 201. The laser processing apparatus 1 thus forms laser-processed grooves 207 in all of the planned dividing lines 203.

Incidentally, in the embodiment, in the groove processing step 1004, the wavelength of the pulsed laser beam 21 is set to 514 nm, and the energy of the pulsed laser beam 21 is set to 5 µJ or higher and 10 µJ or lower (preferably, 8 µJ or higher and 10 µJ or lower). In addition, in the embodiment, the groove processing step 1004 performs the laser processing with an overlap ratio O of 75%, for example.

In addition, while, in the embodiment, in the groove processing step 1004, the laser processing apparatus 1 applies the pulsed laser beam 21 that has the energy distribution 214 depicted in FIG. 6 and forms the spots 216-1 and 216-2 in a rectangular shape as in the blackening step 1003, the pulsed laser beam 21 that forms a round (circular) spot shape may be applied in the present invention.

Thus, in the blackening step 1003, the laser processing method according to the embodiment blackens the functional layer 205 by applying the pulsed laser beam 21 having a higher overlap ratio O and lower energy than in the groove processing step 1004, and in the groove processing step 1004, the laser processing method forms the laser-processed grooves 207 by applying the pulsed laser beam 21 having a lower overlap ratio O and higher energy than in the blackening step 1003.

In the embodiment, the laser processing apparatus 1 stops the application of the pulsed laser beam 21 when the laser processing apparatus 1 forms the laser-processed grooves 207 in all of the planned dividing lines 203 of the wafer 200. In the embodiment, in the laser processing apparatus 1, the moving unit 30 moves the chuck table 10 to the loading and unloading region and stops the chuck table 10 in the loading and unloading region, the chuck table 10 stops holding the wafer 200 under suction, and the clamp units 12 releases the clamping of the annular frame 210. The wafer 200 is unloaded from the holding surface 11 of the chuck table 10. The laser processing apparatus 1 then ends the processing operation and the laser processing method.

The water-soluble protective film on the wafer 200 that has been subjected to the laser processing method according to the embodiment is removed, the wafer 200 is subjected to cutting processing along the planned dividing lines 203, and the wafer 200 is thereby divided into individual devices 204.

As described above, the laser processing method according to the embodiment includes the blackening step 1003 and the groove processing step 1004. The laser processing method in the blackening step 1003 repeatedly applies the pulsed laser beam 21 of energy lower than in the groove processing step 1004 with an overlap ratio O higher than in the groove processing step 1004. In addition, the laser processing method in the groove processing step 1004 applies the pulsed laser beam 21 with the condensing point 21-1 set in the blackened functional layer 205.

Therefore, the laser processing method in the groove processing step 1004 applies the pulsed laser beam 21 to the functional layer 205 in a state of being blackened and thus improved in terms of a property of absorbing the pulsed laser beam 21. Thus, the laser processing method can form the laser-processed grooves 207 by applying the pulsed laser beam 21 without setting the condensing point 21-1 in the substrate 201, that is, in a state in which the peeling of the functional layer 205 is suppressed. As a result, the laser processing method produces an effect of being able to form the laser-processed grooves 207 in the wafer 200 while suppressing the peeling of the functional layer 205.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A laser processing method for performing laser processing on a wafer having organic films on a substrate, the laser processing method comprising:
   a blackening step of emitting a pulsed laser beam of a wavelength transparent to the organic films from a laser oscillator and blackening the organic films by irradiating the organic films with the pulsed laser beam of energy equal to or higher than a processing threshold value at which the organic films are processed such that an overlap ratio of the pulsed laser beam successively applied to the organic films is equal to or more than 90% and less than 100%; and
   a groove processing step of forming a laser-processed groove by irradiating the blackened organic films with the pulsed laser beam and making the blackened organic films absorb the pulsed laser beam, after performing the blackening step.

2. The laser processing method according to claim 1, wherein,
   in the blackening step, base parts of a Gaussian distribution of the pulsed laser beam applied to the organic films are modified to a vertical distribution, so that the pulsed laser beam of energy lower than the processing threshold value is prevented from being transmitted through the organic films and applied to the substrate.

* * * * *